(12) United States Patent
Sun

(10) Patent No.: US 8,724,308 B2
(45) Date of Patent: May 13, 2014

(54) ELECTRONIC DEVICE WITH DATA STORAGE ASSEMBLY

(75) Inventor: Zheng-Heng Sun, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 120 days.

(21) Appl. No.: 13/463,824

(22) Filed: May 4, 2012

(65) Prior Publication Data

US 2013/0163181 A1   Jun. 27, 2013

(51) Int. Cl.
*G06F 1/18* (2006.01)
*H04M 1/02* (2006.01)

(52) U.S. Cl.
CPC ............. *G06F 1/184* (2013.01); *H04M 1/0202* (2013.01)
USPC .................. 361/679.33; 439/541.5; 165/80.3; 360/99.08

(58) Field of Classification Search
CPC ........ G06F 1/00; G06F 2003/00; G06F 1/184
USPC ............... 361/679.43, 679.5, 679.16, 679.47, 361/679.06, 679.26, 679.38, 679.4, 679.02, 361/679.54, 679.46, 679.36, 679.55, 361/679.31, 679.37, 679.01, 679.09, 361/679.21, 679.35, 679.32, 679.34, 361/679.08, 679.33, 754, 737, 810, 695; 439/66, 630, 541.5; 165/80.2, 80.3, 165/104.26, 104.14, 104.33; 360/99.08, 360/234.4, 75, 128, 97.14, 97.22, 97.16; 312/223.1, 223.2, 223.3, 332.1, 319.2, 312/237
See application file for complete search history.

(56) References Cited

U.S. PATENT DOCUMENTS

| | | | |
|---|---|---|---|
| 6,816,368 B2 * | 11/2004 | Yokosawa | 361/679.33 |
| 7,193,856 B2 * | 3/2007 | Hidaka | 361/725 |
| 7,864,519 B2 * | 1/2011 | Lin et al. | 361/679.33 |

\* cited by examiner

*Primary Examiner* — Hung Duong
(74) *Attorney, Agent, or Firm* — Novak Druce Connolly Bove + Quigg LLP

(57) ABSTRACT

An electronic device includes a chassis and a data storage assembly slidably received in the chassis. The data storage assembly includes a bracket and a plurality of hard disk drives uprightly inserted in the bracket, which can arrange more hard disk drives in the bracket effectively.

9 Claims, 3 Drawing Sheets

ELECTRONIC DEVICE WITH DATA STORAGE ASSEMBLY

BACKGROUND

1. Technical Field

The present disclosure relates to an electronic device with data storage assemblies.

2. Description of Related Art

An electronic device, such as a server, includes a plurality of hard desk drives (HDDs) to provide large capacity of data storage. It would be desirable to provide an effective arrangement for the HDDs.

BRIEF DESCRIPTION OF THE DRAWINGS

Many aspects of the present embodiments can be better understood with reference to the drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
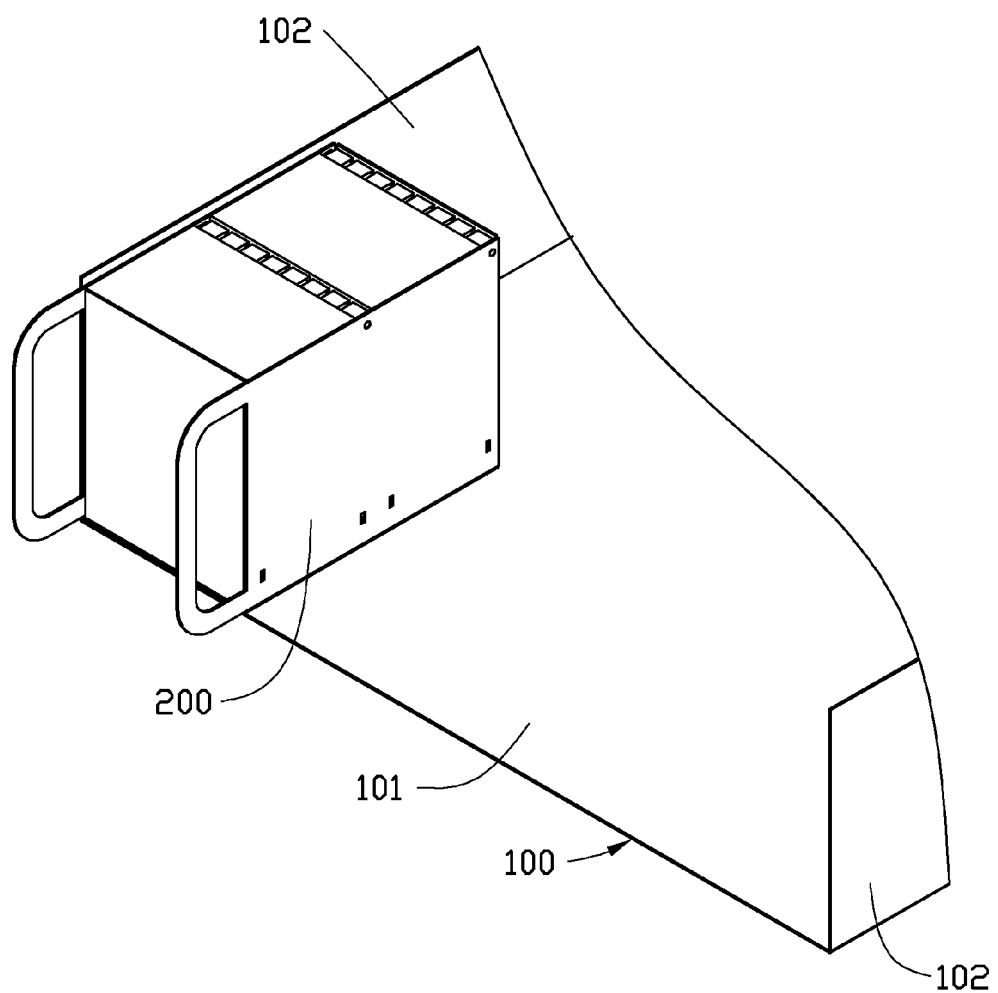
FIG. 1 is a partial, assembled, isometric view of an embodiment of an electronic device.
Figure 2:
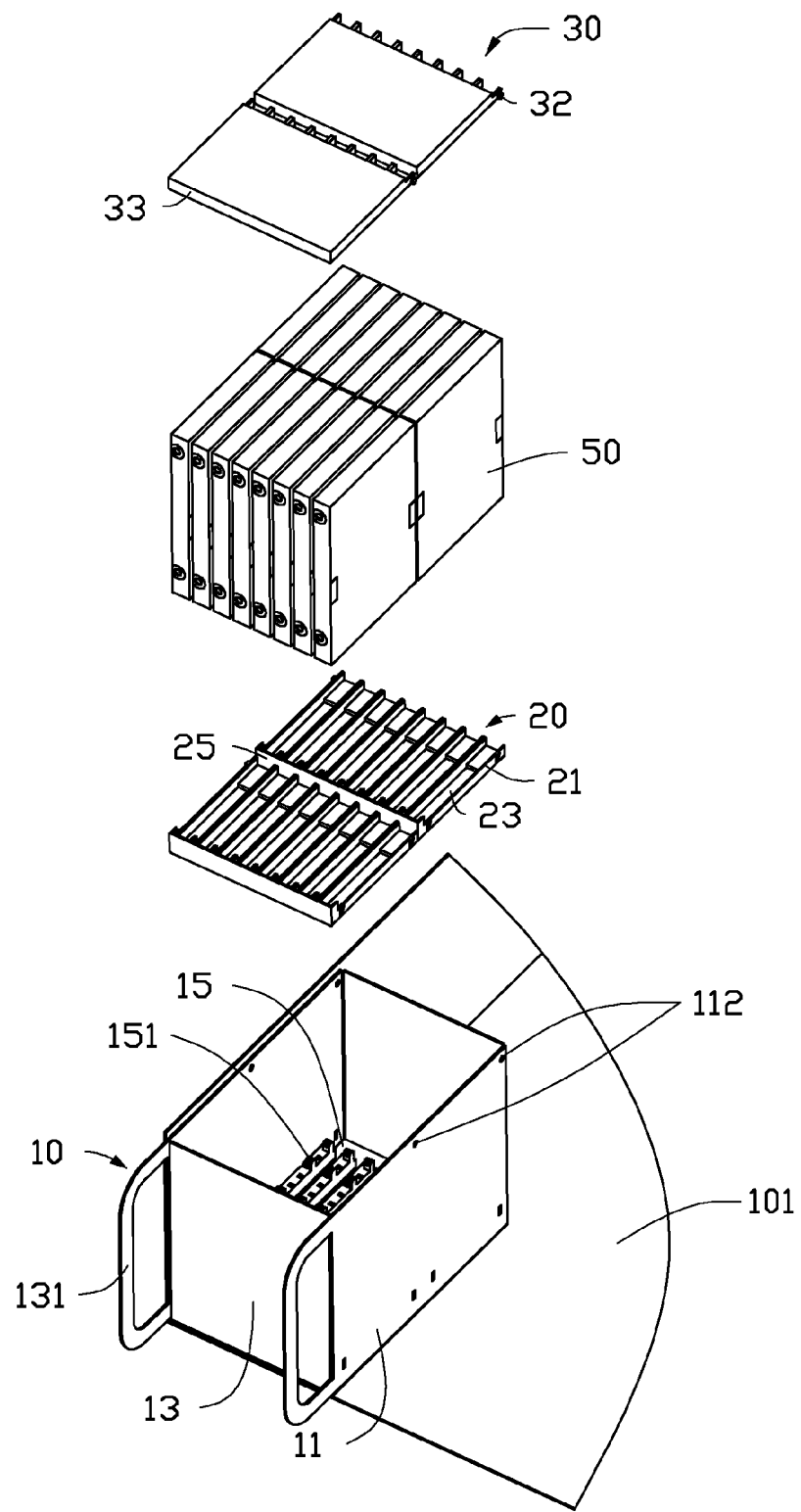
FIG. 2 is an exploded, isometric view of FIG. 1.
Figure 3:
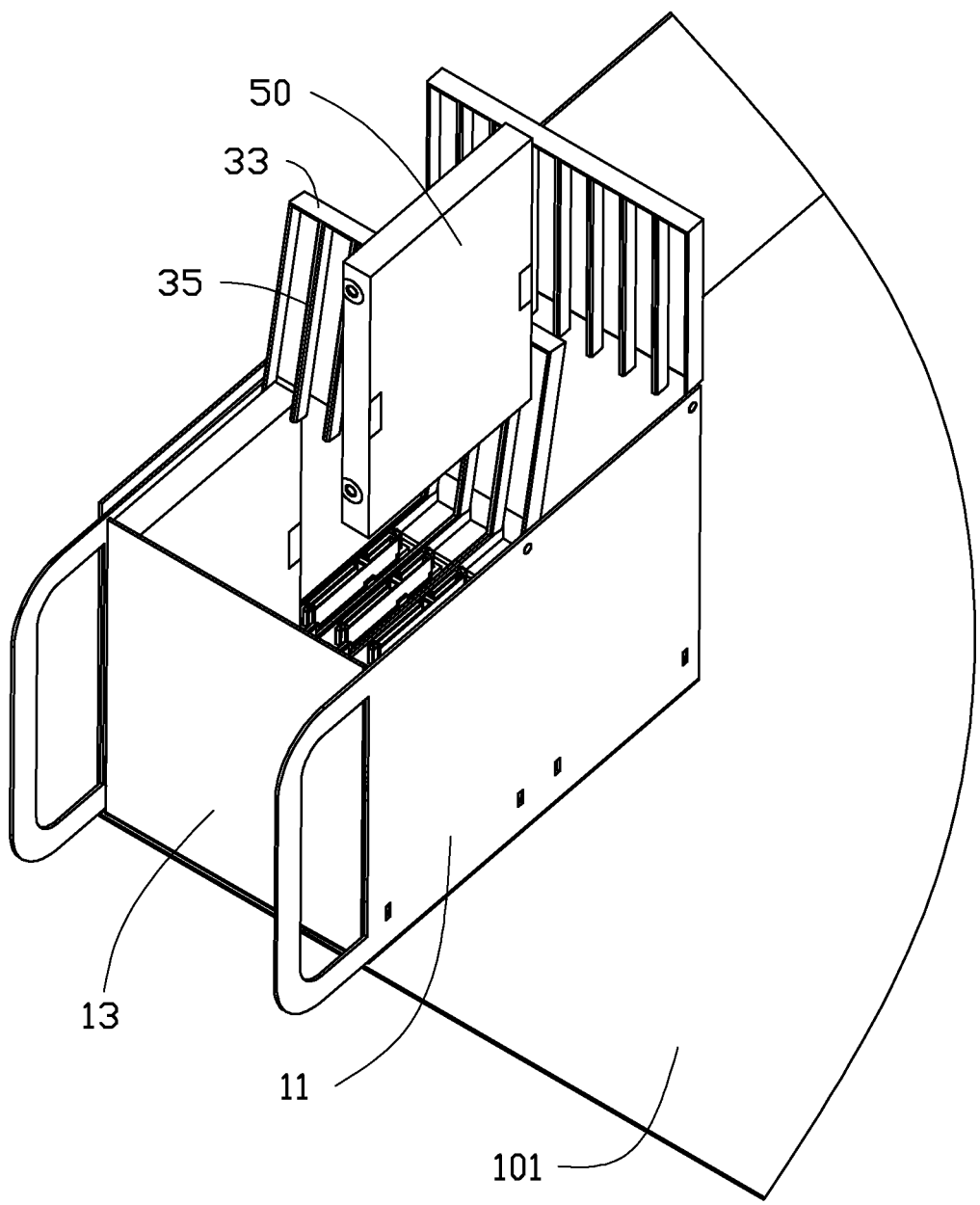
FIG. 3 is an enlarged view of FIG. 1.

Referring to FIG. 1 to FIG. 3, an embodiment of an electronic device includes a chassis 100 and a data storage assembly 200 received in the chassis 100.

The chassis 100 includes a bottom wall 101 and two sidewalls 102 perpendicularly extending from opposite sides of the bottom wall 101.

The data storage assembly 200 includes a bracket 10, a mounting member 20, two covers 30, and a plurality of hard disk drives 50.

The bracket 10 is a box with an opening defined in a top of the box. The bracket 10 includes two opposite side plates 11 and two opposite end plates 13. Two U-shaped handles 131 protrude out from opposite sides of one of the end plates 13. Each side plate 11 defines two pivot holes 112. A backplane 15 is fixed to a bottom of the bracket 10. Two rows of connectors 151 are arranged on the backplane 15.

The mounting member 20 includes two rows of parallel dividing plates 21. A slot 23 is defined between every two adjacent dividing plates 21 in each row. A blocking plate 25 is formed between the two rows of dividing plates 21.

Two pins 32 extend out from opposite sides of each cover 30. A flange 33 is formed between the opposite sides of each cover 30 opposite to the pins 32. A plurality of parallel dividing plates 35 are formed between and parallel to the opposite sides of each cover 30.

In assembly, the mounting member 20 is set on the backplane 15. The connectors 151 extend through the corresponding slots 23 of the mounting member 20. The pins 32 pivotably engage in the pivot holes 112 respectively, to pivotably attach each cover 30 to the bracket 10.

In assembling the HDDs 50, the covers 30 are rotated to open the bracket 10, the HDDs 50 are uprightly inserted into the bracket 10, with the connectors of the HDDs 50 facing down. A first side of each HDD 50 is guided between two adjacent dividing plates 35, to slide down until the connector of the HDD 50 is plugged into the corresponding connector 151. The covers 30 are rotated to close the bracket 10. The opposite ends of the HDDs 50 are locked by the dividing plates 21 and the dividing plate 35, respectively. A second side of the HDD 50 opposite to the first side is blocked by the flange of the corresponding cover 30.

The data storage assembly 200 slides into the chassis 100 along an elongated direction of the sidewalls 102. When the data storage assembly 200 needs to be operated, the handles 131 can be manipulated to pull the data storage assembly 200 from the chassis 100.

In the embodiment, the data storage assembly 200 includes a plurality of HDDs 50 arranged in the bracket 10 uprightly, which can arrange more HDDs 50 in the bracket 10 effectively.

It is to be understood, however, that even though numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A data storage assembly, comprising:
   a bracket with an opening defined in a top of the bracket, a backplane with a plurality of parallel connectors fixed in a bottom of the bracket;
   a mounting member received in the bracket and positioned on the backplane, the mounting member comprising a plurality of parallel first dividing plates and a plurality of slots each defined between two adjacent first dividing plates, the connectors respectively extending through the slots;
   a cover pivotably covering the opening of the bracket, the cover comprising a plurality of parallel second dividing plates; and
   a plurality of hard disk drives uprightly inserted in the bracket through the opening, wherein connectors of the hard disk drives are plugged in the connectors of the backplane respectively, the opposite ends of the hard disk drives are locked by the second dividing plates of the cover and the first dividing plates of the mounting member, respectively.

2. The data storage assembly of claim 1, wherein when assembling the hard disk drives in the bracket, the cover is rotated to uncover the opening, the hard disk drives are uprightly inserted into the bracket with the connectors of the HDDs facing down, first sides of the hard disk drives are guided between two adjacent second dividing plates of the cover, to slide down until the connectors of the hard disk drives are plugged into the corresponding connectors.

3. The data storage assembly of claim 2, wherein a first side of the cover is pivotably mounted to the bracket, a flange is formed from a second side of the cover, first sides of the hard disk drives opposite to the first sides are blocked by the flange of the cover.

4. The data storage assembly of claim 1, wherein two handles extend out from the bracket, to conveniently operate the data storage assembly.

5. The electronic device of claim 1, wherein the chassis comprises a bottom wall and two sidewalls perpendicularly extending from opposite sides of the bottom wall, the data storage assembly is positioned on the bottom wall and slidable along an elongated direction of the sidewalls.

6. An electronic device, comprising:
a chassis; and
a data storage assembly slidably received in the chassis, the data storage assembly comprising:
a bracket with an opening defined in a top of the bracket, a backplane with a plurality of parallel connectors fixed in a bottom of the bracket;
a mounting member received in the bracket and positioned on the backplane, the mounting member comprising a plurality of parallel first dividing plates and a plurality of slots each defined between two adjacent first dividing plates, the connectors respectively extending through the slots;
a cover pivotably covering the opening of the bracket, the cover comprising a plurality of parallel second dividing plates; and
a plurality of hard disk drives uprightly inserted in the bracket, wherein connectors of the hard disk drives are plugged in the connectors of the backplane respectively, the opposite ends of the hard disk drives are locked by the second dividing plates of the cover and the first dividing plates of the mounting member, respectively.

7. The electronic device of claim 6, wherein when assembling the hard disk drives in the bracket, the cover is rotated to open the bracket, the hard disk drives are uprightly inserted into the bracket with the connectors of the HDDs facing down, first sides of the hard disk drives are guided between two adjacent second dividing plates of the cover, to slide down until the connectors of the hard disk drives are plugged into the corresponding connectors.

8. The electronic device of claim 7, wherein a first side of the cover is pivotably mounted to the bracket, a flange is formed from a second side of the cover, first sides of the hard disk drives opposite to the first sides are blocked by the flange of the cover.

9. The electronic device of claim 6, wherein two handles extend out from the bracket, to conveniently operate the data storage assembly.

* * * * *